United States Patent
Gonterman et al.

(10) Patent No.: US 12,137,841 B2
(45) Date of Patent: *Nov. 12, 2024

(54) PERSONAL FOOD DELIVERY APPARATUS AND METHOD

(71) Applicant: NUMNUM, LLC, Pensacola, FL (US)

(72) Inventors: Doug Gonterman, Gulf Breeze, FL (US); Jessica Lineberry, Gulf Breeze, FL (US)

(73) Assignee: NUMNUM, LLC, Pensacola, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,395

(22) Filed: Aug. 24, 2022

(65) Prior Publication Data

US 2023/0123489 A1    Apr. 20, 2023

Related U.S. Application Data

(63) Continuation of application No. 15/294,414, filed on Oct. 14, 2016, now Pat. No. 11,452,407, which is a continuation of application No. 13/694,237, filed on Nov. 9, 2012, now abandoned.

(51) Int. Cl.
*A47J 43/28*    (2006.01)

(52) U.S. Cl.
CPC ............. *A47J 43/28* (2013.01); *A47J 43/288* (2013.01)

(58) Field of Classification Search
CPC .... A47J 9/00; A47J 19/00; A47J 43/28; A47J 43/281; A47G 21/04; A47G 21/045; A47G 21/08; A61J 17/00; A61J 17/001; A61J 17/02; A61J 17/10
USPC ....... 30/142, 147–150, 324–328; 7/110–113; D7/653, 688, 689, 692
See application file for complete search history.

(56) References Cited

U.S. PATENT DOCUMENTS

| | | |
|---|---|---|
| D53,548 S | 7/1919 | Wilson |
| 1,452,464 A | 4/1923 | Isaacs |
| 1,555,502 A | 9/1925 | Knoblauch |
| 1,997,953 A | 4/1935 | Van Der |
| 2,081,011 A | 6/1937 | Lautmann |
| D109,795 S | 5/1938 | Brannock |
| D136,418 S | 10/1943 | Alio |
| D144,599 S | 4/1946 | Tupper |
| D151,666 S | 11/1948 | Wendt |
| 2,485,521 A | 10/1949 | Wendt |
| D161,224 S | 12/1950 | Wendling |

(Continued)

FOREIGN PATENT DOCUMENTS

| | | |
|---|---|---|
| DE | 3436202 A1 | 4/1986 |
| EP | 302305 A1 | 2/1989 |

(Continued)

OTHER PUBLICATIONS

Dip'n 100% Silicone Starter Spoon—2 Count, Online Product Description, available at http://shop.choomee.com/collections/frontpage/products/dipn-100-silicone-starter-spoon-2-ct-aqua-green (2013) (4 pages).

(Continued)

*Primary Examiner* — Jason Daniel Prone
(74) *Attorney, Agent, or Firm* — ALSTON & BIRD LLP

(57) ABSTRACT

A personal food delivery apparatus and method includes a utensil with a handle end and a food end where the food end is a flat surface. A food retaining device is connected with the food end where the food retaining device retains food on the food retaining device.

6 Claims, 2 Drawing Sheets

(56) References Cited

U.S. PATENT DOCUMENTS

| | | |
|---|---|---|
| D163,028 S | 4/1951 | Donaldson |
| 2,610,400 A | 9/1952 | Wendling |
| 2,650,425 A | 9/1953 | Brandel |
| 2,664,630 A | 1/1954 | Brandel |
| D188,618 S | 8/1960 | Latham |
| D188,620 S | 8/1960 | Latham |
| D206,548 S | 12/1966 | Latham |
| D249,450 S | 9/1978 | Guodace |
| 4,159,182 A | 6/1979 | Adolfson |
| D268,077 S | 3/1983 | Morin |
| D298,654 S | 11/1988 | Hendricks |
| D298,721 S | 11/1988 | Rea, Sr. |
| D309,236 S | 7/1990 | Cheng |
| D319,375 S | 8/1991 | Pasinski et al. |
| 5,167,070 A | 12/1992 | Hirzel |
| 5,230,156 A | 7/1993 | Patenaude |
| D339,964 S | 10/1993 | Knox |
| 5,255,439 A | 10/1993 | Liss |
| D343,100 S | 1/1994 | Jenkinson et al. |
| D387,953 S | 12/1997 | Town et al. |
| 5,711,759 A | 1/1998 | Smith et al. |
| D396,614 S | 8/1998 | Cousins |
| 5,794,996 A | 8/1998 | Mohabir |
| D398,196 S | 9/1998 | Proshan |
| D405,660 S | 2/1999 | Hansen et al. |
| 5,920,993 A | 7/1999 | Wenk |
| D431,976 S | 10/2000 | Backstrom et al. |
| D432,877 S | 10/2000 | Kwok |
| 6,134,790 A | 10/2000 | Watson |
| D433,602 S | 11/2000 | Yu |
| 6,145,204 A | 11/2000 | Cash |
| D437,737 S | 2/2001 | Durbin et al. |
| D446,091 S | 8/2001 | Short |
| D461,379 S | 8/2002 | Wang |
| 6,524,272 B1 | 2/2003 | Berry |
| D477,965 S | 8/2003 | Kortleven et al. |
| D477,972 S | 8/2003 | Schulein |
| D479,102 S | 9/2003 | Edelman |
| D480,280 S | 10/2003 | Schulein |
| D489,584 S | 5/2004 | Cohen et al. |
| D491,420 S | 6/2004 | Shibata et al. |
| D491,425 S | 6/2004 | Rosenthal |
| D496,232 S | 9/2004 | Kaposi et al. |
| D496,833 S | 10/2004 | Lantz |
| D508,830 S | 8/2005 | Moore |
| D519,332 S | 4/2006 | Sanchez |
| D523,299 S | 6/2006 | Johnson |
| D525,836 S | 8/2006 | Moore |
| D536,583 S | 2/2007 | Bodum |
| D536,934 S | 2/2007 | Huber |
| D539,618 S | 4/2007 | Bodum |
| D561,540 S | 2/2008 | Rhodes, II |
| D571,620 S | 6/2008 | Miller |
| D576,000 S | 9/2008 | Allen et al. |
| D594,274 S | 6/2009 | McKenzie |
| D608,448 S | 1/2010 | Rappon et al. |
| D627,200 S | 11/2010 | Rothman |
| D629,263 S | 12/2010 | Pico et al. |
| D630,064 S | 1/2011 | Lee et al. |
| D641,595 S | 7/2011 | Marari |
| D648,602 S | 11/2011 | Gray |
| D651,870 S | 1/2012 | Romanko |
| 8,387,263 B1 | 3/2013 | Roberts |
| D695,361 S | 12/2013 | Roehrig et al. |
| D699,525 S | 2/2014 | Wasserman |
| D705,022 S | 5/2014 | Meignan |
| 8,857,065 B2 | 10/2014 | Behbehani |
| D740,083 S | 10/2015 | Wasserman |
| D743,754 S | 11/2015 | Fine |
| D744,300 S | 12/2015 | Genatossio et al. |
| D751,354 S | 3/2016 | De Leo |
| D766,671 S | 9/2016 | Edelman |
| D800,515 S | 10/2017 | Gonterman et al. |
| D808,744 S | 1/2018 | Hammi et al. |
| D922,835 S | 6/2021 | Cao |
| 11,452,407 B2 | 9/2022 | Gonterman et al. |
| 2003/0145471 A1 | 8/2003 | Sano et al. |
| 2004/0194322 A1 | 10/2004 | Bullard et al. |
| 2005/0091854 A1 | 5/2005 | Johnson |
| 2005/0179272 A1 | 8/2005 | Gonzalez |
| 2006/0202494 A1 | 9/2006 | Di Paolo |
| 2007/0203450 A1 | 8/2007 | Berry |
| 2007/0251103 A1 | 11/2007 | Rhodes |
| 2008/0256807 A1 | 10/2008 | Kirkup |
| 2009/0126204 A1 | 5/2009 | Wagner et al. |
| 2010/0325896 A1 | 12/2010 | Hebebrand |
| 2011/0004244 A1 | 1/2011 | Brown et al. |
| 2011/0214291 A1 | 9/2011 | Blitz |
| 2011/0214300 A1 | 9/2011 | Matari |
| 2012/0227593 A1 | 9/2012 | Megdal |
| 2012/0297629 A1 | 11/2012 | Behbehani |
| 2013/0181467 A1 | 7/2013 | Truesdell |
| 2014/0075763 A1 | 3/2014 | Karns et al. |
| 2014/0130359 A1 | 5/2014 | Gonterman et al. |

FOREIGN PATENT DOCUMENTS

| | | |
|---|---|---|
| EP | 0476932 A1 | 3/1992 |
| KR | 200459127 Y1 | 3/2012 |
| WO | WO-01/30214 A2 | 5/2001 |
| WO | WO-2014/074123 A1 | 5/2014 |

OTHER PUBLICATIONS

International Preliminary Report on Patentability issued on May 12, 2015 for application PCT/US2013/000237, filed on Oct. 11, 2013 and published as WO 2014/074123 on May 15, 2014.

International Search Report issued on Jan. 7, 2014 for application PCT/US2013/000237, filed on Oct. 11, 2013 and published as WO 2014/074123 on May 15, 2014.

Civil Action No. 3:23-cv-279, *Luv N' Care, LTD* vs. *Numnum, LLC*, filed in the United States District Court Western District of Louisiana Monroe Division on Mar. 1, 2023.

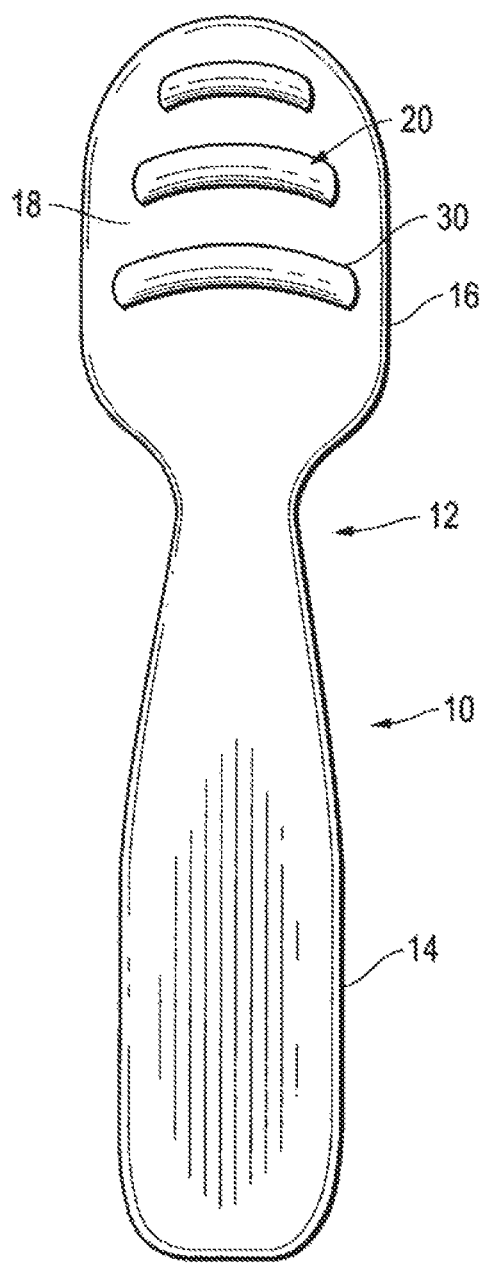
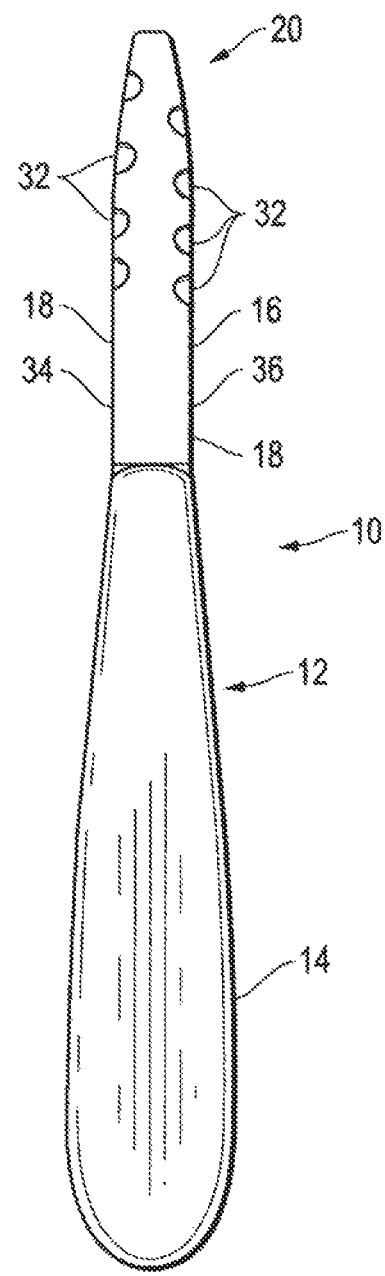
FIG. 3
FIG. 4

PERSONAL FOOD DELIVERY APPARATUS AND METHOD

CROSS-REFERENCE TO RELATED APPLICATIONS

This application is a continuation of U.S. application Ser. No. 15/294,414, titled "PERSONAL FOOD DELIVERY APPARATUS," filed Oct. 14, 2016, which is a continuation of U.S. application Ser. No. 13/694,237, filed on Nov. 9, 2012, both of which are incorporated herein by reference in their entirety.

FIELD OF THE INVENTION

This invention relates to a personal food delivery apparatus and method. In particular, in accordance with one embodiment, the invention relates to a personal food delivery apparatus including a utensil with a handle end and a food end where the food end is a flat surface. A food retaining device is connected with the food end where the food retaining device retains food on the food retaining device.

BACKGROUND OF THE INVENTION

A problem exists with regard to the use of utensils for the delivery of food for personal consumption. In particular, for example only and not by way of limitation, infants transitioning from food in bottles, for example, to solid foods initially do not have the fine motor skills to handle spoons and forks. The prior art is replete with bent spoons and forks that are designed to enable an infant to grasp the utensil. While they are of some value in that regard, they do nothing to address the problem of actually getting the food into the baby's/infant's mouth. Again, the problem Applicant has identified is that babies and infants may be able to grasp a utensil but they do not have the skill to transfer the utensil with food into their mouth. Thus, prior art curved utensils are typically as large as, or nearly as large as normal utensils, since it is understood that at least for some period of time the parent/adult will use the utensil to feed the infant.

Further, the prior art does not describe or suggest a solution to the problem of food slipping off or spilling out of utensils as the food is transferred to the user's mouth. That is, prior art spoons, forks and knives include smooth surfaces. Most problematical are spoons with concave surfaces that require a user to balance the food within the spoon. Until and unless the user has the motor skills to properly use them, food will slip off of or spill out of the prior art smooth surfaced utensils.

Thus, there is a need in the art for a personal food delivery utensil that enables individuals with minimum fine motor skills, babies, infants, accident victims, and the like, for example only, to feed themselves without the assistance of others. It therefore is an object of this invention to provide a personal food delivery utensil that includes a handle and a food retaining device. The entire utensil may be of a normal form but a smaller size suitable for an infant and smaller than normal adult utensils. Further, the food retaining device enables the user to simply insert the utensil into food and the food retaining device holds the food in place as it is transferred to the user's mouth. This eliminates the need to maintain the utensil in a proper plane so as to avoid the food slipping off or spilling out of the utensil.

SUMMARY OF THE INVENTION

Accordingly, the personal food delivery apparatus of the present invention, according to one embodiment, includes a utensil with a handle end and a food end where the food end is a flat surface. A food retaining device is connected with the food end where the food retaining device retains food on the food retaining device.

All terms used herein are given their normal ordinary meaning. Thus, "utensil" describes a device for use in the consumption of foods, such as a spoon, knife and fork or a combination thereof or any other utensil device now known or hereafter developed. "Food" includes solid and semi-solid foods such as pureed foods, spaghetti, mashed potatoes, and the like, for example only. "Food retaining device" describes a device to which food, as described above, attaches. The attachment is accomplished by the provision of a retaining device onto or into which the food connects, all as will be more fully described hereafter.

In one aspect, the handle is conformed in size to be held by infants. By this it is meant that the handle is proportional to the size of the infant's hand. In another aspect, the utensil is approximately four inches long including the handle end and the food end.

In one aspect, the food retaining device consists of a number of depressions extending into the food end non-curved, flat surface. In another aspect, the food retaining device is at least one hole extending though the food end non-curved, flat surface from side to side. In a further aspect of this embodiment, the hole is conformed to create arms in the food end, where the arms extend into the hole.

In another aspect, the food retaining device is a projection extending from the non-curved, flat surface. In one aspect of this invention, the projection consists of a number of raised, rounded elements. In another aspect, the projection consists of at least one raised ridge element. In a further aspect, the food retaining device is on both sides of the non-curved, flat surface of the food end.

According to another embodiment of the invention, a personal food delivery apparatus consists of a utensil with a handle end, where the handle is conformed in size to be held by infants, and a food end where the food end is non-curved, flat surface. A food retaining device is connected with the food end where the food retaining device retains food on the food retaining device where the food retaining device is selected from a group of devices consisting of: a number of depressions in the non-curved, flat surface and at least one projection from the non-curved, flat surface.

In another aspect, the number of depressions further includes at least one depression that creates a hole extending though the food end non-curved, flat surface from side to side. In one aspect, the hole is conformed to create arms in the food end, where the arms extend into the hole. In another aspect, the projection consists of a number of raised, rounded elements. In one aspect, the projection consists of at least one raised ridge element. In another aspect, the food retaining device is on both sides of the non-curved, flat surface of the food end.

According to another embodiment of the invention, a personal food delivery method consists of:
  a. providing a utensil with a handle end and a food end where the food end is non-curved, flat surface; a food retaining device connected with the food end where the food retaining device retains food on the food retaining device; and
  b. inserting the food end in food.

In another aspect, the food retaining device is selected from a group of devices consisting of: a number of depressions in the non-curved, flat surface and at least one projection from the non-curved, flat surface. In another aspect, the number of depressions further includes least one depression that creates a hole extending though the food end non-curved, flat surface from side to side. In one aspect, the food retaining device is on both sides of the non-curved, flat surface of the food end.

DESCRIPTION OF THE DRAWINGS

Other objects, features and advantages of the present invention will become more fully apparent from the following detailed description of the preferred embodiment, the appended claims and the accompanying drawings in which:

FIG. 3 is a front view of the invention of FIG. 1 with raised ridges; and

FIG. 4 is a side view of the invention of FIG. 1 with a number of depressions on both sides of the food end.

DETAILED DESCRIPTION OF THE INVENTION

The preferred embodiment of the present invention is illustrated by way of example in FIGS. 1-4. With specific reference to FIG. 1, according to a preferred embodiment, a personal food delivery apparatus 10 includes a utensil 12. In the figures, utensil 12 most closely resembles a common spoon but, preferably, utensil 12 is approximately four inches long. Thus, it is in a familiar shape, except as more fully described hereafter, but it is smaller than normal for use by infants, for example only. Obviously, any size of utensil 12 that is deemed useful is included in the scope of the invention. Further, utensil 12 may be in the form of a fork, a knife or any other common form as deemed useful so long at they include the required elements of the invention as more particularly described.

Figure 1:
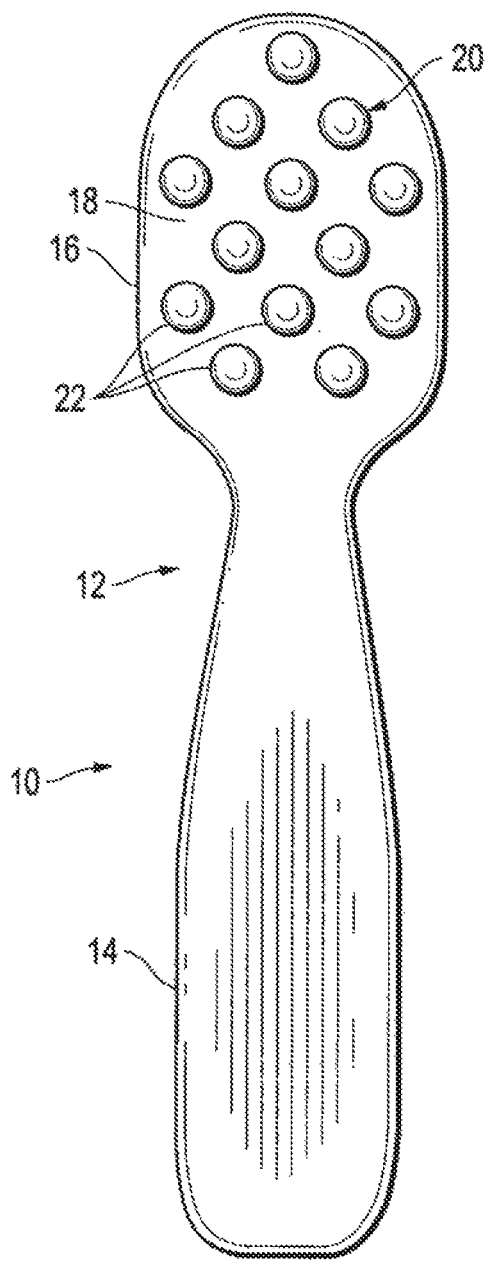
FIG. 1 is a front view of the personal food delivery apparatus according to a preferred embodiment illustrating food retaining projections in the form of raised rounded elements in the food end.

Utensil 12 includes a handle end 14 and a food end 16. Handle end 14 is elongated and in any useful form for ease of holding. Handle end 14 blends into food end 16, preferably seamlessly, as shown. Food end 16 is distinguished from handle end 14 in that it includes an extended flat surface 18 as shown and as more clearly understood with reference to FIG. 4. Flat surface 18 in the figures includes a peripheral shape more or less like that of a common spoon. However, flat surface 18 does not include a concave receptacle for holding food as with a common spoon. Instead, the flat surface 18 of food end 16 includes a food retaining device 20. FIG. 1 shows food retaining device 20 in the form of a number of raised, rounded elements 22. In use, Applicant has determined that raised, rounded elements 22 are unexpectedly efficient and effective in picking up and holding soft solid food such as mashed potatoes. It is also unexpectedly efficient in retaining food such as spaghetti, for example only.

Figure 2:
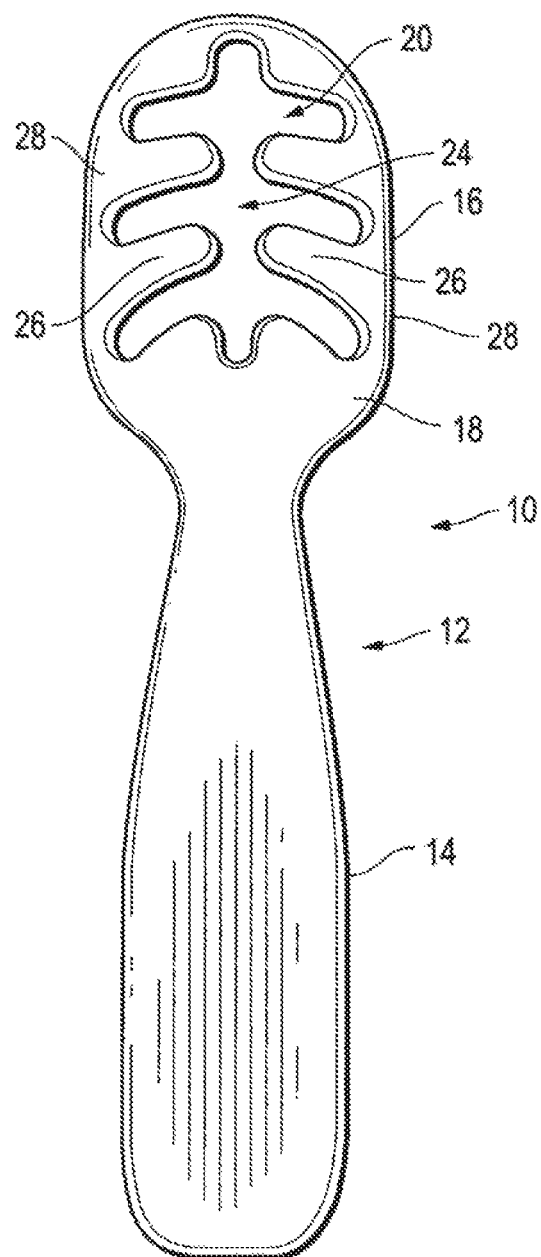
FIG. 2 is a is a front view of the invention of FIG. 1 with food retaining holes through the flat surface of the food end.

Referring to FIG. 2, the same numbers used in FIG. 1 identify the same elements of this and the other figures as well. In this embodiment, however, food retaining device 20 is in the form of a hole 24. Hole 24 passes completely though flat surface 18 of the food end 16. Hole 24 can be in any useful form. Applicant has determined, however, that one particularly effective form is as illustrated. In this shape, hole 24 creates arms 26 that extend from the interior edge 28 of food end 16. Here again, Applicant has determined that arms 26 which create a shaped hole 24, or vice versa, provides a surprisingly effective food entrapment system for a wide variety of foods. Even such foods as peas, rice and beans are easily transported by infants as they are trapped in the hole 24 by the arms 26, for example only.

Referring now to FIG. 3, in this embodiment, food retaining device 20 is in the form of raised ridges 30. Three raised ridges 30 are shown in the figure but, of course, more or fewer ridges may be formed in the flat surface 18 of food end 16. Raised ridges 30 may be separate from one another as shown or connected if deemed useful. In any presentation, the raised ridges 30 have been found to be entirely satisfactory in providing a place for food to be gripped by utensil 12.

Referring now to FIG. 4, the side view of the personal food delivery apparatus 10 shows both flat surfaces 18 of the two sides of food end 16. In this embodiment, food retaining device 20 consists of a number of depressions 32. The figure also illustrates a feature of the invention where the food retaining device 20 is incorporated into both sides, 34 and 36, of food end 16. This structure has been found to be particularly effective in trapping food.

In use, an infant, for example only, grasps handle end 14 in a normal form. This acclimates the infant to the look and feel of actual utensils but, again, utensil 12 is preferably sized appropriately for the infant. Thereafter, the infant merely has to introduce the food end 16 into food (not shown). Food retaining device 20 enables utensil 12 to pick up the food. The infant then moves the personal food delivery apparatus 10 to his or her mouth without having to hold utensil 12 in any particular attitude. It is at this time, the transfer of food to the mouth, that prior art devices fail for those lacking the fine motor skills to properly move them without dropping the food from the utensil. Instead, in Applicant's invention, food is held in place on the utensil 12 by food retaining device 20. Certainly some amount of food will adhere to even the normal spoon, knife or fork but they are designed for maximum effective use to be operated in a required manner in order to deliver adequate amounts of food each time. This is a requirement infants, for example, cannot meet. Use of Applicant's personal food delivery apparatus 10, however, ensures that adequate amounts of food are delivered while at the same time allowing a baby to participate in self-feeding earlier with less mess. The psychological benefits or early development of self-feeding skill with a normally shaped utensil Applicant believes to be significant.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A utensil, comprising:
    a rounded handle end; and
    a food end consisting of an exterior edge and a first non-concave surface having interior extending arms, wherein the utensil is approximately four inches long, wherein the food end is to enter into a person's mouth, and wherein the interior extending arms in combination with portions of the first non-concave surface together define a food retaining edge, wherein the food retaining edge defines a hole comprising one or more projecting portions.

2. The utensil of claim 1, wherein the food end comprises a second non-concave surface opposite the first non-concave surface and defining a second side of the exterior edge, the interior arms, the food retaining edge, and the hole.

3. The utensil of claim 1, wherein the handle end blends into the food end.

4. The utensil of claim 1, wherein the hole is the only hole in the utensil.

5. The utensil of claim 1, wherein the interior extending arms comprise eight arms.

6. The utensil of claim 1, wherein the utensil has a longitudinal axis, wherein the food end has a maximum width in a direction perpendicular to the longitudinal axis, wherein the hole has a maximum width in the direction perpendicular to the longitudinal axis, and wherein the maximum width of the hole is most of the maximum width of the food end in the direction perpendicular to the longitudinal axis.

\* \* \* \* \*